United States Patent [19]

Stemme et al.

[11] 4,362,259

[45] Dec. 7, 1982

[54] APPARATUS FOR STEPWISE TRANSPORT OF PHOTOGRAPHIC FILM OR THE LIKE

[75] Inventors: Otto Stemme, Munich; Eduard Wagensonner, Aschheim; Bernhard von Fischern, Ottobrunn, all of Fed. Rep. of Germany

[73] Assignee: AGFA-Gevaert Aktiengesellschaft, Leverkusen, Fed. Rep. of Germany

[21] Appl. No.: 235,837

[22] Filed: Feb. 19, 1981

[30] Foreign Application Priority Data

Feb. 20, 1980 [DE] Fed. Rep. of Germany ....... 3006241

[51] Int. Cl.³ .......................................... B65H 17/26
[52] U.S. Cl. ................................................... 226/123
[58] Field of Search .......... 226/33, 120, 123, 134–139, 226/27, 29, 42, 43, 52; 355/123, 133, 72, 74; 250/571

[56] References Cited

U.S. PATENT DOCUMENTS 3,904,099 9/1975 Inoue ..................................... 226/33
4,037,768 7/1977 Escales .................................. 226/43
4,095,732 6/1978 Merritt ................................... 226/33

*Primary Examiner*—Leonard D. Christian
*Attorney, Agent, or Firm*—Kontler, Grimes & Battersby

[57] ABSTRACT

Apparatus for stepwise transport of exposed and developed photographic films through a copying machine so as to place selected film frames, namely those film frames which are to be imaged onto photographic paper and are designated by holes or other types of indices, into register with the copying station has two photoelectronic detectors the first of which transmits signals to the forward input and the second of which transmits signals to the reverse input of a forward and reverse counter in a circuit which regulates the speed of the film transporting motor. The second detector is located downstream of the first detector and both detectors transmit signals on detection of indices denoting the film frames to be copied. The circuit decelerates the motor, either stepwise or abruptly, in response to detection of indices by the first detector, arrests the motor for a given interval of time in response to detection of indices by the second detector, and ensures that the motor is driven at a maximum speed in the absence of indices between the first and second detectors. The speed of the motor can be increased from zero to maximum speed in a single stage, in several stages, or continuously. This can be accomplished by connecting the operational amplifier for the motor in circuit with a voltage divider wherein one or more resistors are connected in parallel with switching transistors which are energizable with appropriate delays by a timer receiving impulses from the second detector.

15 Claims, 3 Drawing Figures

APPARATUS FOR STEPWISE TRANSPORT OF PHOTOGRAPHIC FILM OR THE LIKE

BACKGROUND OF THE INVENTION

The present invention relates to apparatus for transporting photographic films, and more particularly to improvements in apparatus for stepwise transport of elongated webs of photosensitive material. Still more particularly, the invention relates to improvements in apparatus which can be utilized for stepwise transport of exposed and developed photographic films through a copying machine so as to place selected frames of the film into register with the copying station.

It is known to provide selected film frames of an exposed and developed photographic film with indicia which can be detected by automatic monitoring devices for the purpose of generating signals which are used to arrest the film whenever a selected film frame registers with the copying station. Such mode of operation is desirable in order to guarantee that the film is arrested only when a frame whose image is to be reproduced is in register with the copying station, i.e., the transport of film between successive stoppages should take place at a maximum speed to ensure that the copying machine can turn out a large number of prints per unit of time. Heretofore known transporting apparatus are not entirely satisfactory, either owing to excessive complexity, due to relatively low speed of transport of the film between successive stoppages, or owing to failure of conventional apparatus to arrest the film in exact positions of register of selected frames with the copying station.

OBJECTS AND SUMMARY OF THE INVENTION

An object of the invention is to provide a novel and improved apparatus for stepwise transport of elongated webs of photosensitive material, especially for moving selected frames of exposed and developed photographic films into register with the copying station of a copying machine.

Another object of the invention is to provide an apparatus which can place selected portions of an intermittently advanced web into exact register with a predetermined station irrespective of whether the selected portions are closely adjacent to or spaced apart from each other and regardless of whether successive selected portions are equidistant or spaced apart at different distances from each other.

A further object of the invention is to provide an apparatus which can be installed in existing photographic copying or like machines as a superior substitute for heretofore known film transporting apparatus.

An additional object of the invention is to provide the apparatus with novel and improved means for evaluating and processing signals which are generated on detection of selected portions of an intermittently transported web of photographic material.

Another object of the invention is to provide an apparatus which can rapidly place successive selected portions of an intermittently transported web into register with a predetermined station and which can treat the web gently so that the web is not likely to tear in response to changes in speed.

A further object of the invention is to provide an apparatus which can serve for transport of exposed and developed photographic films through a copying machine and is constructed and assembled in such a way that the film frames which are not to be copied can be transported through the copying station at an elevated speed in order to move, with a minimum of delay, the next-following frames which are to be copied into register with the copying station.

An ancillary object of the invention is to provide novel and improved electronic means for processing signals which are generated on detection of indices or markers denoting the film frames whose images are to be reproduced onto photographic paper or the like in a copying machine for customer films.

Another object of the invention is to provide the apparatus with novel and improved means for regulating the speed of the motor which transports exposed and developed films through a photographic copying machine.

The invention is embodied in an apparatus for transporting elongated webs wherein selected ones of a plurality of substantially equidistant portions are denoted by automatically detectable indices or markers, particularly for transporting exposed and developed photographic films (certain film frames of which are denoted by indices in the form of holes, notches, dark spots or the like) through a copying machine wherein each frame which has been designated for copying must be placed into exact alinement with the copying station. The apparatus comprises variable-speed motor means (e.g., a suitable d-c motor) which is operable to transport a web in a predetermined direction and along a predetermined path (e.g., between a supply reel and a takeup reel), first and second monitoring means (each of which may constitutes a photoelectronic detector) adjacent to the path and respectively arranged to generate first and second signals on detection of indices in the path (the second monitoring means is located downstream of the first monitoring means, as considered in the direction of transport of the web and the distance between the first and second monitoring means preferably equals at least 6d wherein d is the distance between the centers of two neighboring portions of the web in the path), and regulating means for respectively reducing the speed of and temporarily arresting the motor means in response to the first and second signals and for increasing the speed of the motor means to a predetermined maximum value in the absence of indices intermediate the first and second monitoring means.

The regulating means comprises a forward and reverse counter (e.g., a 3-bit counter) with a forward input connected to first monitoring means, with a reverse input connected to the second monitoring means and several outputs connected to the corresponding inputs of a suitable logic circuit, e.g., an OR gate whose output is connected with the means for directly influencing the speed of the motor means through the medium of a further logic circuit, such as a second OR gate. First and second pulse shaper circuits are preferably interposed between the first and second monitoring means on the one hand and the forward and reverse inputs of the counter on the other hand.

The means for directly influencing the speed of the motor means may include a voltage divider having a plurality of resistors and a tap and switching transistor means which is energizable by signals at the output of the second OR gate to bypass at least one of the resistors. Still further, such influencing means may comprise a signal comparing stage (e.g., an operational amplifier whose output is connected with the motor means by way of a system of transistors) one input of which is connected with the aforementioned tap and the other input of which is connected with a source of reference signals, e.g., a tachometer generator which is driven by the motor means and which generates signals denoting the speed of the motor means.

The means for arresting the motor means in response to signals from the second monitoring means may comprise an electronic switch which can disconnect the motor means from one or more energy sources for intervals of time which are determined by suitable timer means, e.g., a monostable multivibrator or a digital counter interposed between the second monitoring means and the arresting means. A suitable time delay unit can be connected between the output of the timer means and one input of the second OR gate so that the timer means can influence the timing of changes in the speed of the motor means by enabling the second OR gate to transmit a signal which causes the switching transistor to bridge at least one resistor in the voltage divider.

Alternatively, the voltage divider can include a plurality of switching transistors, each connected in parallel with a different resistor of the voltage divider. One of the switching transistors is connected directly with the output of the second OR gate and the remaining switching transistors are connected with such output by suitable trigger circuits each of which transmits signals with a different delay.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
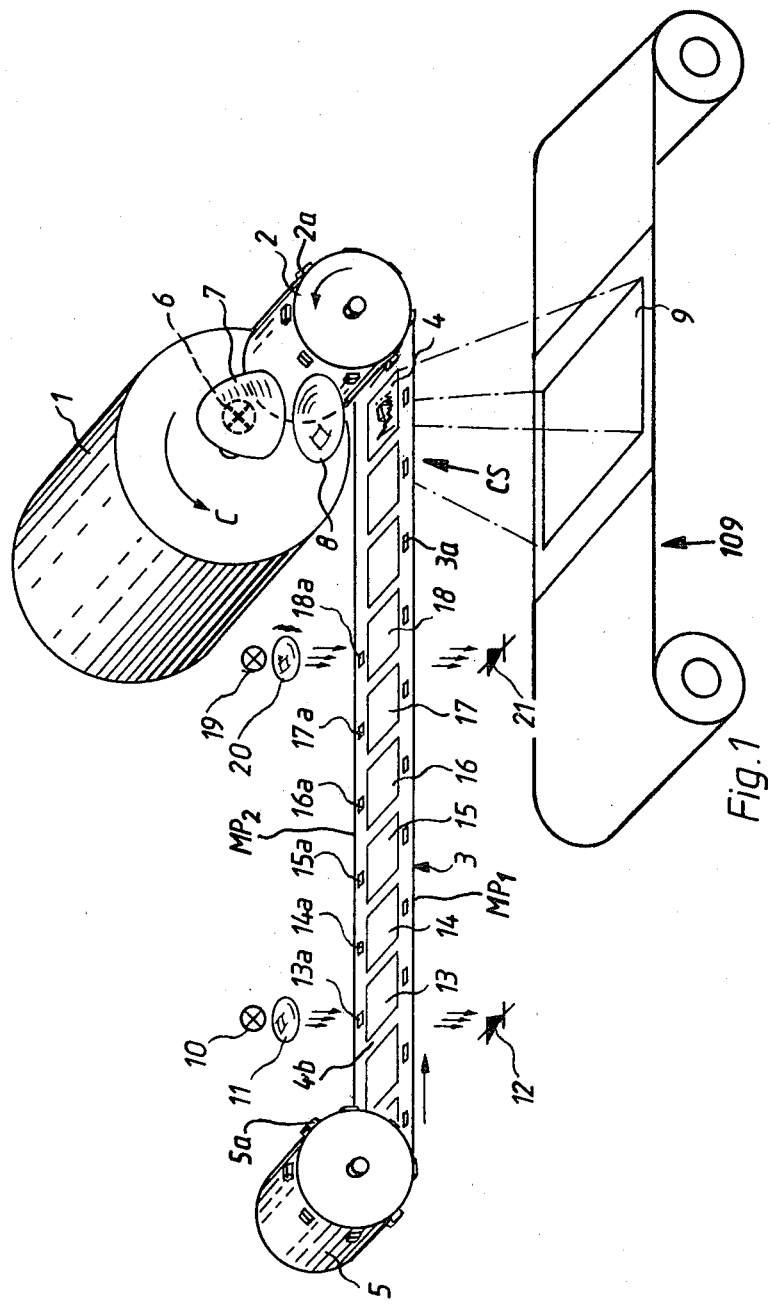
FIG. 1 is a perspective view of an apparatus which embodies one form of the invention.

Referring first to FIG. 1, there is shown a portion of a photographic copying machine wherein successive or certain frames 4 of an exposed and developed photographic film 3 are imaged onto photographic paper 9. The copying machine comprises or is combined with an apparatus for transporting successive frames 4 toward and into register with copying station CS where the images of selected frames are reproduced onto photographic paper. The transporting apparatus comprises a takeup conveyor 2 in the form of a toothed drum which is coupled to or mounted on the output shaft of a variable-speed d-c motor 1, and a toothed supply conveyor or drum 5 which pays out the film 3. The teeth 2a and 5a of the drums 2 and 5 penetrate into the perforations 3a in one marginal portion MP1 of the film 3. The other marginal portion MP2 of the film 3 is formed with indices or markers denoting the adjacent or corresponding film frames. FIG. 1 shows that the film frames 4 numbered 13, 14, 15, 16, 17 and 18 are respectively identified by indices or markers 13a, 14a, 15a, 16a, 17a and 18a each of which is a hole or opening in the marginal portion MP2 so as to allow a beam of light to pass therethrough.

At the copying station CS, the copying machine comprises a source 6 of copying light, a reflector 7 which directs the light against an optical system 8, and a transporting unit 109 which advances successive portions or sections of a strip of photographic paper 9 into register with that film frame 4 whose image is illuminated by light issuing from the source 6. The parts 6, 7 and 8 are located at one side, and the transporting unit 109 is located at the other side of the path along which successive frames 4 of the film 3 advance from the drum 5 toward the drum 2 when the motor 1 is on to drive the drum 2 in a counterclockwise direction, as viewed in FIG. 1. The direction of rotation of the output element of the motor 1 is indicated by the arrow C, and the arrow D indicates the direction of transport of the film 3 along a path extending between the parts 6, 7, 8 on the one hand and the transporting unit 109 on the other hand.

In accordance with a feature of the invention, the structure of FIG. 1 further comprises a first photoelectronic monitoring device or detector including a light source 10 and a lens 11 at one side and a photoelectronic transducer 12 at the other side of the path for the web 3. The lens 11 focuses light rays issuing from the source 10 upon successive (oncoming) indices 13a, 14a, 15a, etc., and the transducer 12 is in register with an index when the latter permits light to pass therethrough.

A second photoelectronic monitoring device or detector is located downstream of the first detector 10, 11, 12. The second detector comprises a light source 19, a lens 20 and a transducer 21. These parts cooperate in the same way as the parts of the first detector, i.e., the transducer 21 generates a detectable signal whenever it is exposed to light issuing from the source 19, focused by the lens 20 and passing through an index or hole (13a, 14a, etc.) between the lens 20 and the transducer 21. The distance between the two detectors 10–12 and 19–21 equals or approximates the combined width of six film frames 4 plus the frame lines 4b between such frames. As shown in FIG. 1, the lens 11 directs light from the source 10 upon the index 13a when the lens 20 focuses light issuing from the source 19 upon the index 18a. The distance between the detectors 10–12 and 14–21 can exceed the combined length of six film frames 4 (plus the requisite number of frame lines 4b).

In the illustrated embodiment, the indices 13a, 14a, etc. are immediately adjacent to and are disposed substantially midway between the front and rear portions of the corresponding film frames (numbered 13, 14, etc.). However, it is equally within the purview of the invention to shift the indices with reference to the centers of the associated film frames or to provide the indices in the marginal portion MP1 or in the frame lines 4b which precede or follow the corresponding frames.

Figure 2:
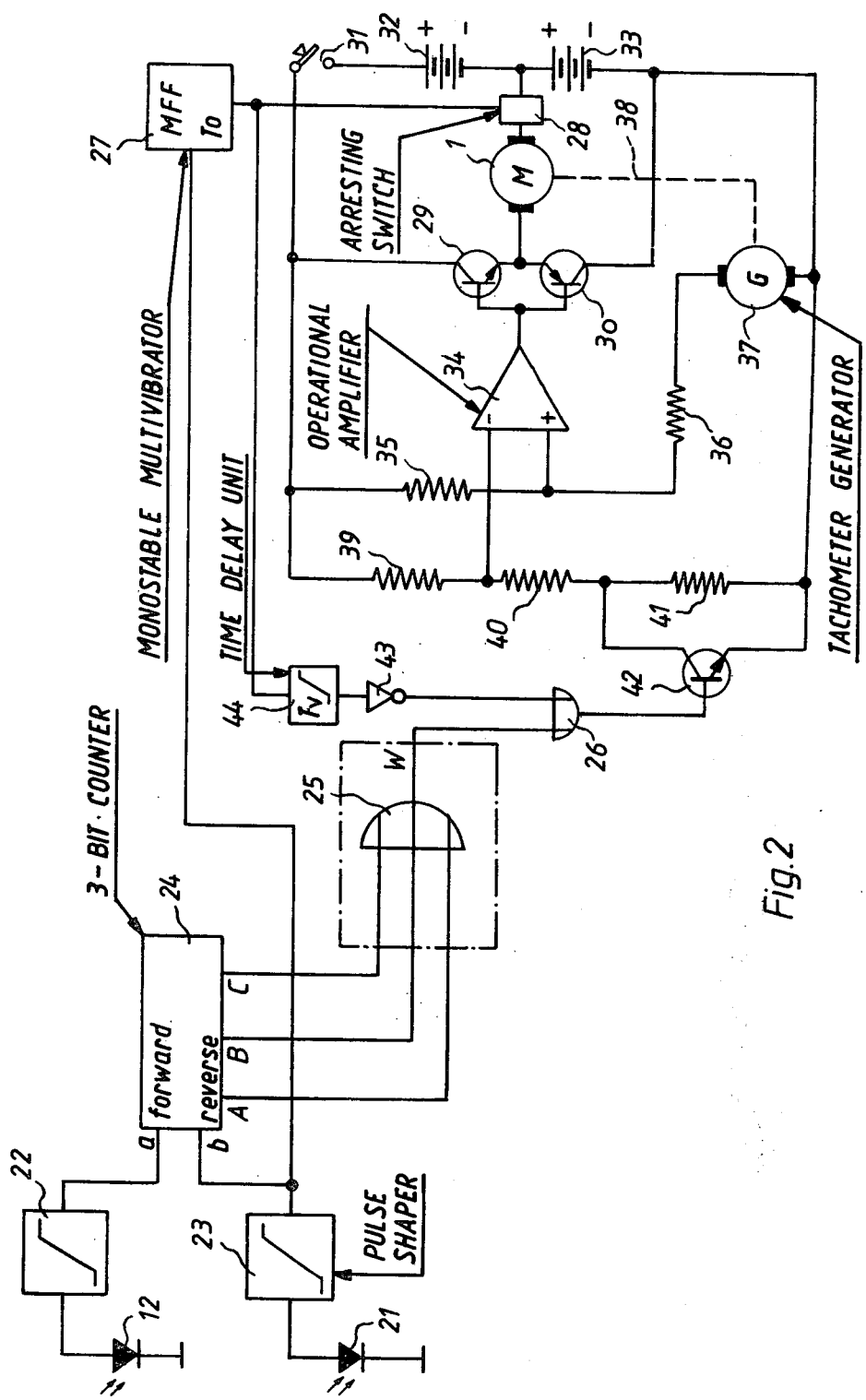
FIG. 2 is a diagram of the circuit which regulates the speed of the prime mover in the apparatus of FIG. 1.

As shown in FIG. 2, the transducer 12 of the first detector 10–12 is a silicon diode which transmits signals to the input of a first pulse shaper 22. The transducer 21 is also a silicon diode which transmits signals to the input of a second pulse shaper 23. The outputs of the two pulse shapers 22 and 23 are respectively connected to the inputs a and b of a forward reverse counter 24 which is a 3-bit counter of conventional design. For example, the counter 24 may constitute an electronic component of the type known as SN 74193 N described on page 149 of the German publication entitled "Das TTL-Knochbuch" and published by Texas Instruments Deutschland GmbH. The input a is the forward input and the input b is the reverse input of the counter 24.

The three outputs A, B and C of the counter 24 are connected with the corresponding inputs of a logic circuit here shown as an OR gate 25 whose output W is connected with the input a of a second OR gate 26.

The output of the pulse shaper 23 which is associated with the transducer 21 of the second detector 19–21 is further connected to the input a of a timer here shown as a monostable multivibrator 27 with a time constant of $T_o$. This is the interval of delay between the application of a signal to the input a and the appearance of a signal at the output c of the multivibrator 27. In the idle or stable condition of the multivibrator 27, the signal at the output c equals "1", and such signal equals "0" in unstable condition of the multivibrator. The output c of the multivibrator 27 is connected with the second input b of the OR gate 26 by way of time-delay unit 44 with a time constant $T_v$ and an inverter 43. Furthermore, the output c of the monostable multivibrator 27 is connected with an electronic arresting switch 28 which is in circuit with the variable-speed d-c motor 1. The switch 28 enables the motor 1 to drive the toothed drum 2 when the monostable multivibrator 27 transmits a signal "1", and the motor 1 is idle when the signal at the output c of the monostable multivibrator 27 equals "0". Otherwise stated, the electronic switch 28 conducts when the monostable multivibrator 27 is in stable condition, and the switch 28 blocks in unstable condition of the monostable multivibrator. The monostable multivibrator 27 can be replaced with a different timer, e.g., a binary counter (not shown).

As shown in FIG. 2, the electronic switch 28 is connected in series with the motor 1 which latter is further connected with the emitters of two transistors 29 and 30. The collector of the transistor 29 can be connected with the positive pole of an energy source 31 (e.g., a battery) by way of a master switch 31 which is actuatable by an attendant when the copying machine is to be started. The collector of the second transistor 30 is connected with the negative pole of a second energy source (e.g., a battery) 33. The electronic arresting switch 28 is connected between the negative and positive poles of the energy sources 32 and 33.

The bases of the transistors 29 and 30 are connected to each other as well as to the output c of a signal comparing stage here shown as an operational amplifier 34. The non-inverting input a of the amplifier 34 is connected with the tap 35a of a first voltage divider including two resistors 35 and 36 as well as a tachometer generator 37 which latter is driven by the motor 1 through the medium of a suitable operative connection 38 (indicated in FIG. 2 by broken lines). The tachometer generator 37 constitutes a source of reference signals denoting the actual speed of the motor 1 and transmits such signals to the input a of the amplifier 34. The input b of the amplifier 34 receives signals denoting the desired speed of the motor 1, and the output c of the amplifier transmits signals to the bases of the transistors 29, 30 when the intensity of signal at its input a deviates from the intensity of signal at the input b.

The inverting input b of the operational amplifier 34 is connected with the tap 39a of a second voltage divider including resistors 39, 40 and 41. The resistor 41 can be shunted or bypassed by a switching transistor 42 which is in parallel with the resistor 41 and whose base is connected with the output of the OR gate 26. As mentioned above, the second input b of the OR gate 26 is connected with the output c of the monostable multivibrator 27 through the medium of the time-delay unit 44 and inverter 43. The potential at the input a and output b of the time-delay unit 44 equals "1" when the monostable multivibrator 27 assumes its stable condition. The potential at the input a and output b of the time delay unit 44 equals "0" when the monostable multivibrator 27 assumes its unstable condition. Thus, and owing to the presence of the inverter 43, the potential at the second input b of the OR gate 26 equals "0" when the monostable multivibrator 27 assumes its stable condition, i.e., when the signal at the output b of the time-delay unit 44 equals "0". Therefore, when the monostable multivibrator 27 assumes its unstable condition, the signal at the second input b of the OR gate 26 equals "1". It will be understood that, owing to the constant of the time-delay unit 44, the change of potential at the output c of the monostable multivibrator 27 is followed by a change of potential at the input b of the OR gate 26 with a delay $T_v$.

The operation is as follows:

The master switch 31 is closed to thus energize the circuit of FIG. 2. The motor 1 is started and reaches its nominal (maximum) speed after a given interval of time. For example, the nominal speed of the motor 1 can be selected in such a way that the toothed drum 2 transports one hundred frames 4 per second. It is further assumed that the transistor 29 is energized and the transistor 30 blocks. Such conditions of the transistors 29 and 30 correspond to rotation of the output element of the motor 1 in the direction which is indicated by the arrow C. The transistor 42 blocks, i.e., the resistor 41 is connected in series with the resistors 39, 40 and is fully effective.

The index 18a identifying the foremost frame 4 (numbered 18) to be copied is assumed to be located immediately or shortly ahead of the first detector 10–12, i.e., the index 18a is about to enter the space between the lens 11 and the transducer 12. As the drum 2 continues to draw the film 3 in the direction of the arrow D, the index 18a reaches the position between the lens 11 and the transducer 12 whereby the latter transmits a signal to the input a of the counter 24 via pulse shaper 22 so that the counter 24 is advanced by a step from its starting or initial condition. At such time, the intensity of voltage signals at the outputs A, B and C of the counter 24 respectively equals "1", "0" and "0". Consequently, the output W of the OR gate 25 transmits a voltage signal "1", and the same signal appears at the output of the OR gate 26. This energizes the transistor 42 which short-circuits the resistor 41 of the voltage divider 39–41. Consequently, the voltage at the inverting input b of the operational amplifier 34 abruptly assumes a lower value so that the RPM of the output element of the motor 1 (and hence the RPM of the takeup drum 2) is reduced accordingly. For example, the speed of the drum 2 can be reduced to such an extent that the rate of transport of film frames is reduced from one hundred to forty-eight per second.

As the film 3 continues to advance in the direction of the arrow D, the second index 17a moves into the range of the first detector 10–12 and the transducer 12 transmits a second signal which passes through the pulse shaper 22 and is applied to the input a of the counter 24. The latter is advanced by a step so that its outputs A, B and C respectively transmit the signals "0", "1" and "0". The signal ("1") at the output W of the OR gate 25 remains unchanged, and the same applies for the signal at the output of the OR gate 26 and hence for the condition of the transistor 42, i.e., the motor 1 continues to drive the drum 2 at the reduced speed of forty-eight frames 4 per second. In the same way, the oncoming indices 16a, 15a, 14a and 13a cause the transducer 12 to trasmit four additional signals to the input a of the counter 24 whereby the distribution of signals at the outputs A, B and C of the counter 24 changes in accordance with the following truth table wherein the first column denotes the serial number of the signal which is generated by the transducer 12, the second to fourth columns denote the signals at the outputs A, B and C of the counter 24, and the last column denotes the nature of signal at the output W of the OR gate 25. It will be noted that the potential at the output W of the OR gate 25 remains unchanged (namely, "1").

| No. | A | B | C | W |
|---|---|---|---|---|
| 0 | 0 | 0 | 0 | 0 |
| 1 | 1 | 0 | 0 | 1 |
| 2 | 0 | 1 | 0 | 1 |
| 3 | 1 | 1 | 0 | 1 |
| 4 | 0 | 0 | 1 | 1 |
| 5 | 1 | 0 | 1 | 1 |
| 6 | 0 | 1 | 1 | 1 |

The foremost index 18a reaches the detector 19-21 when the last (13a) of the six successive indices (18a, 17a, 16a, 15a, 14a, 13a) reaches the detector 10-12. This causes the counter 24 to rest itself by one step, i.e., the potential at the outputs A, B and C of the counter 24 then respectively equals "1", "0" and "1". The signal ("1") at the output W of the OR gate 25 remains unchanged (see the truth table of FIG. 2).

When the transducer 21 transmits a signal to the input b of the counter 24 via pulse shaper 23, such signal is also applied to the input a of the monostable multivibrator 27 which blocks the electronic switch 28 for the interval $T_o$. Consequently, the motor 1 is arrested for the same interval ($T_o$). The frame 4 which is numbered "18" is located in the path of light issuing from the source 6, i.e., such frame is imaged onto the registering portion of the strip of photographic paper 9. When the interval $T_o$ elapses, the electronic switch 28 again receives the signal "1" so that the motor 1 can be started again. At the same time, the voltage signal "1" at the output c of the monostable multivibrator 27 is applied to the input a of the time-delay unit 44 whose output b transmits such signal, with the delay $T_v$, to the inverter 43 so that the signal at the input b of the OR gate 26 then equals "0". However, this does not change the condition of the transistor 42, i.e., this transistor continues to conduct and the motor 1 drives the drum 2 at the reduced speed after the interval $T_o$ (namely, the interval during which the electronic switch 28 was closed) elapses.

The same procedure is repeated when the transducer 21 of the second detector 19-21 transmits signals to the input b of the counter 24 in response to detection of the indices 17a, 16a, 15a and 14a. When the index 13a moves into the space between the lens 20 and the transducer 21 of the second detector 19-21, the counter 24 reassumes its original state, i.e., the potential at each of its outputs A, B and C equals zero. Therefore, the potential at the output W of the OR gate 25 changes abruptly to "0", i.e., the potential at the input a of the OR gate 26 equals zero.

When the interval $T_o$ (after the input a of the monostable multivibrator 27) has received a signal generated in response to detection of the index 13a by the detector 19-21) has elapsed, the electronic switch 28 ceases to block the circuit of the motor 1, the potential at the second input b of the OR gate 26 changes to "0" after elapse of the interval $T_v$ (note the time-delay unit 44 between the output c of the monostable multivibrator 27 and the input b of the OR gate 26). However, during the delay $T_v$, the first input a of the OR gate 26 receives the signal "1" so that the motor 1 is driven at the lesser of two speeds. Once the interval $T_v$ has elapsed, the transistor 42 begins to block and, therefore, the voltage divider 39-41 causes the motor 1 to drive the drum 2 at the higher of the two speeds.

Figure 3:
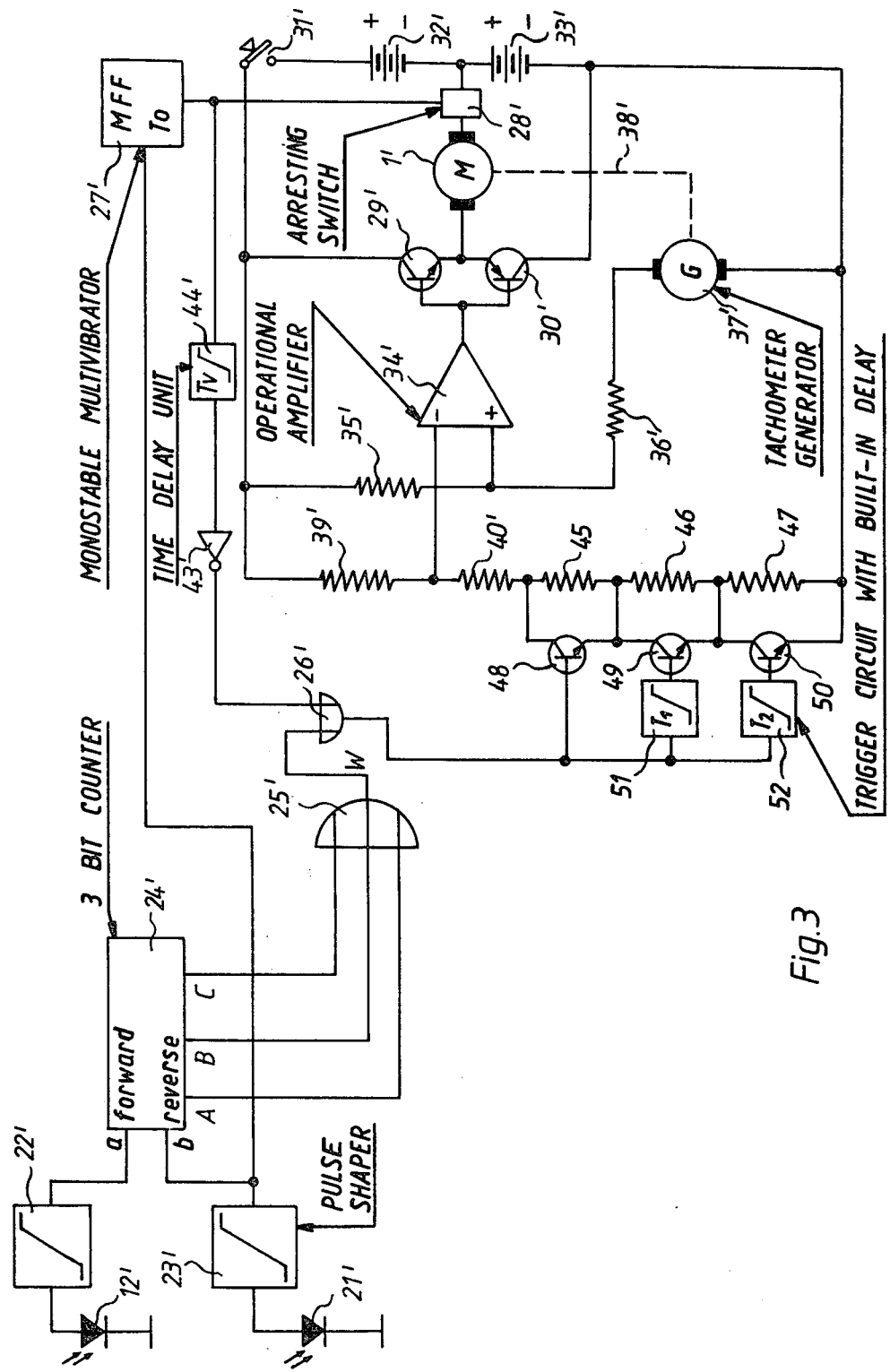
FIG. 3 is a diagram of a modified regulating circuit.

All such constituents of the circuit shown in FIG. 3 which are identical with or clearly analogous to the corresponding parts of the circuit shown in FIG. 2 are denoted by similar reference characters each followed by a prime.

In the circuit of FIG. 3, the resistor 41 of the voltage divider 39-41 shown in FIG. 2 is replaced by three resistors 45, 26 and 47 which are connected in series. Three switching transistors 48, 49 and 50 are provided to respectively short-circuit the resistors 47, 46 and 45. The base of the transistor 48 is connected directly with the output of the OR gate 26'. The base of the transistor 49 is connected with the output of the OR gate 26' by a trigger circuit 51 with a built-in delay which is constructed and assembled in such a way that the potential which is applied to its input is applied to the base of the transistor 49 with a delay $T_1$. A second trigger circuit 52 is connected between the output of the OR gate 26' and the base of the transistor 50; the delay with which the circuit 52 transmits signals from the gate 26' to the base of the transistor 50 equals $T_2$. The interval $T_2$ exceeds the interval $T_1$. In accordance with a presently preferred embodiment, the interval $T_2$ equals $2T_1$. For example, the interval $T_1$ can match that period of time which is required to advance the film 3 by the length of a frame 4.

When the foremost index 18a of the film 3 reaches the detector which includes the transducer 12' of FIG. 3, the transistor 48 conducts and the RPM of the motor 1' (and hence the RPM of the drum 2) is abruptly reduced below the nominal speed. After elapse of the interval $T_1$, the transistor 49 begins to conduct and shunts the associated resistor 46. Consequently, the RPM of the motor 1' undergoes a renewed abrupt reduction. After elapse of the interval $T_2$, the transistor 50 begins to conduct and shunts the associated resistor 47 to thus initiate a further abrupt reduction of RPM of the motor 1'.

In the following truth table, the first column denotes the serial number of the signal which is generated by the transducer 12', the second to fourth columns denote the signals at the outputs A, B and C of the counter 24', and the last column denotes the nature of the signal at the output W of the OR gate 25'.

| No. | A | B | C | W |
|---|---|---|---|---|
| 0 | 0 | 0 | 0 | 0 |
| 1 | 1 | 0 | 0 | 1 |
| 2 | 0 | 1 | 0 | 1 |
| 3 | 1 | 1 | 0 | 1 |

-continued

| No. | A | B | C | W |
|---|---|---|---|---|
| 4 | 0 | 0 | 1 | 1 |
| 5 | 0 | 0 | 1 | 1 |
| 6 | 0 | 1 | 1 | 1 |

It will be noted that the indices 18a, 17a, etc. advance toward the second detector (including the transducer 21' of FIG. 3) at a greatly reduced speed, i.e., the film 3 can be said to creep along the path between the drums 2 and 5. The film 3 is arrested, always for the interval $T_o$, when a frame 4 to be copied reaches the station CS. When the counter 24' of FIG. 3 is reset to zero, the transistor 48, 49 and 50 conduct for an interval $T_v$ so that the film 3 continues to advance at the reduced speed subsequent to transport of the last index 13a past the second detector including the transducer 21'. However, once the interval $T_v$ has elapsed, the transistor 48 blocks ahead of the transistors 49 and 50 whereby the resistor 45 becomes effective in the voltage divider including the resistors 39', 40' and 45 to 47. The RPM of the motor 1' rises abruptly from the lowermost speed to a predetermined higher speed. After the interval $T_1$, the transistor 49 blocks simultaneously with the transistor 48 so that the resistor 46 becomes effective and the RPM of the motor 1' undergoes a renewed abrupt increase, again to a predetermined value. After the elapse of the interval $T_2$, the transistor 20 also begins to block and the resistor 47 becomes effective with the result that the RPM of the motor 1' is increased to its maximum value.

An advantage of the regulating circuit of FIG. 3 is that the speed of the motor 1' is returned to the normal or maximum speed in several stages so that the likelihood of tearing of the film 3 and/or of damaging of the film in the regions of perforations 3a is even more remote. Consequently, it is possible to design the regulating circuit of FIG. 3 in such a way that the normal operating speed of the motor 1' is very high in order to ensure that little time is lost for transport through the station CS of those frames 4 which need not be imaged onto the photographic paper 9.

In each of the two illustrated embodiments of the present invention, the film 3 is advanced at an increased speed (arrow D in FIG. 1) until a next-following index (not shown) reaches the first detector. Thus, the RPM of the motor 1 or 1' is highest when there are no indices in the space between the first and second detectors.

An important advantage of the improved apparatus is that it can regulate the speed of the motor 1 or 1' without resort to friction clutches, slip clutches or similar complex and expensive equipment and without any damage to the film 1 even though the film is preferably transported by devices (such as the drums 2 and 5) having teeth (2a and 5a) which extend into the perforations 3a of the film. The same holds true if the drums 2 and 5 are replaced by other positive transporting means, e.g., by claws which penetrate into the perforations 3a to advance the film 1 by increments of predetermined length.

An advantage of the counter 24 is that it constitutes a simple and reliable means for counting the number of indices between the two detectors 10-12 and 19-21 (or the corresponding detectors including the transducers 12' and 21' of FIG. 3) to thus ensure that the speed of the motor 1 or 1' is raised to the normal or maximum value as soon as the counter is reset to zero, i.e., as soon as the counter has ascertained the absence of any indices between the transducers 12, 21 or 12' or 21'.

The improved apparatus is susceptible of many additional modifications without departing from the spirit of the invention. For example, the device 27 can be designed to reassume its stable condition in dependency on the intensity of light issuing from the source 6, i.e., it can sense the termination of a copying operation at the station CS. Alternatively, and as described in connection with FIG. 2, the multivibrator 27 can have a fixed time constant $T_o$.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transporting elongated webs wherein selected ones of a plurality of substantially equidistant portions are denoted by automatically detectable indices, particularly for transporting through a photographic copying machine webs of exposed and developed photographic film certain frames of which are denoted by indices in the form of holes or the like, comprising variable-speed motor means operable to transport a web in a predetermined direction along a predetermined path; first and second monitoring means adjacent to said path and respectively arranged to generate first and second signals on detection of indices in said path, said second monitoring means being located downstream of said first monitoring means, as considered in said direction; and regulating means for respectively reducing the speed of and temporarily arresting said motor means in response to said first and second signals and for increasing the speed of said motor means in the absence of indices intermediate said first and second monitoring means.

2. The apparatus of claim 1, wherein each of said monitoring means comprises an optoelectronic detector.

3. The apparatus of claim 1, wherein said regulating means comprises a forward and reverse counter having forward and reverse inputs respectively connected with said first and second monitoring means.

4. The apparatus of claim 3, further comprising first and second pulse shaper means respectively interposed between said first and second monitoring means and the respective inputs of said counter.

5. The apparatus of claim 1, wherein the distance between said first and second monitoring means equals at least 6d wherein d is the distance between two neighboring portions of the web in said path.

6. The apparatus of claim 1, wherein said regulating means comprises a forward and reverse counter having forward and reverse input means respectively connected with said first and second monitoring means and a plurality of signal transmitting output means, a logic circuit having a plurality of input means each connected with a different output means of said counter and output means, and means for influencing the speed of said motor means in response to signals at the output of said logic circuit.

7. The apparatus of claim 6, wherein said influencing means comprises a voltage divider having a plurality of resistors and a tap and transistor means energizable by signals at the output of said logic circuit to bypass at least one of said resistors, a signal comparing stage having a first input connected with said tap and a second input and a source of reference signals connected with the second input of said stage, said stage further having an output connected with said motor to effect a change of the speed of said motor when the intensity of signals applied to the first input of said stage deviates from the intensity of reference signals applied to the second input of said stage.

8. The apparatus of claim 7, wherein said source includes a tachometer generator arranged to furnish reference signals denoting the speed of said motor.

9. The apparatus of claim 1, wherein said regulating means comprises means for arresting said motor in response to signals from said second monitoring means and timer means interposed between said second monitoring means and said arresting means to apply the signals to said arresting means for a given interval of time in response to each signal from said second monitoring means.

10. The apparatus of claim 9, wherein said timer means includes a monostable multivibrator.

11. The apparatus of claim 9, wherein said timer means includes a digital counter.

12. The apparatus of claim 9, wherein said regulating means further comprises a forward and reverse counter having forward and reverse inputs respectively connected with said first and second monitoring means and a plurality of outputs, a first OR gate having inputs connected with the outputs of said counter and an output, a second OR gate having a first input connected with the output of said first OR gate, a second input and an output, a time delay unit connected between said timer means and the second input of said second OR gate, and means for varying the speed of said motor in response to signals at the output of said second OR gate.

13. The apparatus of claim 12, wherein said speed varying means comprises at least one switching transistor having a base connected with the output of said second OR gate.

14. The apparatus of claim 12, wherein said speed varying means comprises a battery of at least two switching transistors with the collector of one of said transistors connected to the emitter of the other of said transistors, and a resistor connected in parallel with each of said transistors.

15. The apparatus of claim 14, wherein said speed varying means further comprises a third switching transistor having a collector connected with the emitter of said one switching transistor and first and second trigger circuits with time delay means respectively connected between the output of said second OR gate and the bases of said one and said other switching transistor.

* * * * *